(12) United States Patent
Li et al.

(10) Patent No.: US 10,592,102 B2
(45) Date of Patent: Mar. 17, 2020

(54) METHOD FOR IMPLEMENTING DIALING KEYPAD OF TOUCH SCREEN AND SMART WATCH

(71) Applicant: Goertek Inc., Shandong (CN)

(72) Inventors: Hongcai Li, Shandong (CN); Huilin Wang, Shandong (CN)

(73) Assignee: Goertek Inc., Shandong (CN)

( * ) Notice: Subject to any disclaimer, the term of this patent is extended or adjusted under 35 U.S.C. 154(b) by 128 days.

(21) Appl. No.: 15/578,168

(22) PCT Filed: May 24, 2016

(86) PCT No.: PCT/CN2016/083086
§ 371 (c)(1),
(2) Date: Nov. 29, 2017

(87) PCT Pub. No.: WO2016/192547
PCT Pub. Date: Dec. 8, 2016

(65) Prior Publication Data
US 2018/0150215 A1     May 31, 2018

(30) Foreign Application Priority Data
May 29, 2015 (CN) .......................... 2015 1 0289826

(51) Int. Cl.
*G06F 3/048* (2013.01)
*G06F 3/0488* (2013.01)
(Continued)

(52) U.S. Cl.
CPC ......... *G06F 3/04886* (2013.01); *G04G 21/08* (2013.01); *G06F 3/0488* (2013.01);
(Continued)

(58) Field of Classification Search
CPC ............. G06F 3/04886; G06F 3/04883; G06F 3/0488; G06T 3/60; G04G 21/08; H04M 2250/22
See application file for complete search history.

(56) References Cited

U.S. PATENT DOCUMENTS 5,621,904 A * 4/1997 Elliott ................... G06F 3/0481
                                                                715/798
2007/0152979 A1   7/2007 Jobs et al.
(Continued)

FOREIGN PATENT DOCUMENTS

CN         2726232 Y     9/2005
CN      101345784 A     1/2009
(Continued)

OTHER PUBLICATIONS

Homeschool Math, measuring angles with a protractor, 2014, available at http://web.archive.org/web/20140422052352/http://www.homeschoolmath.net/teaching/g/measure_angles.php, hereinafter "Homeschool".*
(Continued)

*Primary Examiner* — Matthew Ell
(74) *Attorney, Agent, or Firm* — Alston & Bird LLP

(57) ABSTRACT

A method for realizing a dialing keypad of a touch screen, and smart watch. The method comprises: acquiring size information of the touch screen, and configuring a circular display region of the touch screen by using a center of the touch screen as an origin and a preset length as a radius (S10); configuring attributes of each dialing control of the dialing keypad, the attributes of the dialing controls comprising numeral information, display information and angle information of the dialing controls (S20); uniformly arranging, according to the acquired size information of the touch screen and the angle information of each dialing control of the dialing keypad, all dialing controls of the dialing keypad on a periphery of an edge of the circular display region (S30); and displaying, according to the numeral information and the display information of each dialing control of the dialing keypad, all dialing controls of the dialing keypad on the periphery of the edge of the circular display region of the touch screen (S40). The method effectively reduces a mistaken touch operation in a dialing process.

14 Claims, 2 Drawing Sheets

(51) Int. Cl.
*G04G 21/08* (2010.01)
*G06T 3/60* (2006.01)

(52) U.S. Cl.
CPC ............ *G06F 3/04883* (2013.01); *G06T 3/60* (2013.01); *H04M 2250/22* (2013.01)

(56) References Cited

U.S. PATENT DOCUMENTS

| | | | | |
|---|---|---|---|---|
| 2008/0259047 | A1* | 10/2008 | Jung | ............ H04M 1/23 345/173 |
| 2010/0037185 | A1* | 2/2010 | Li | ............ G06F 3/04847 715/863 |

FOREIGN PATENT DOCUMENTS

| | | |
|---|---|---|
| CN | 101644970 A | 2/2010 |
| CN | 103402000 A | 11/2013 |
| CN | 104915142 A | 9/2015 |

OTHER PUBLICATIONS

Sony SmartWatch User Guide, Dec. 2011 hereinafter Sony.*
International Searching Authority, International Search Report (ISR) and Written Opinion for International Application No. PCT/CN2016/083086, dated Jul. 26, 2016, 10 pages, Intellectual Property Office of the P.R.C., China.

* cited by examiner

METHOD FOR IMPLEMENTING DIALING KEYPAD OF TOUCH SCREEN AND SMART WATCH

CROSS REFERENCE TO RELATED APPLICATIONS

This application is a national stage application, filed under 35 U.S.C. § 371, of International Application No. PCT/CN2016/083086, filed May 24, 2016, which application claims priority to Chinese Application No. 201510289826.9, filed May 29, 2015, the contents of both of which as are hereby incorporated by reference in their entirety.

BACKGROUND

The present invention relates to the technical field of computers, and in particular, to a method for implementing a dialing keypad of a touch screen and a smart watch.

Smart watches are multi-functional intelligent devices which may be connected to a network by building intelligent systems and carrying smart phone systems therein. At present, the smart watches may be substantially divided into two kinds. One kind includes ones without phone functions, which can synchronize resources in phones, for example, calls, text messages, e-mails, photos and music resources in the phones. The other kind includes ones with phone functions, which support SIM (Subscriber Identity Module) cards and are smart phones in watch forms in essence.

A phone module is an important functional module of a smart watch with a phone function. Since a screen of the smart watch is relatively small, for operations of fingers on the screen, mistriggers may easily occur in a dialing process of a dialing keypad in a common Sudoku arrangement, resulting in poor user experiences.

BRIEF SUMMARY

The present invention is directed to solve a problem of poor user experiences due to possible mistriggers in a dialing process of a dialing keypad in the prior art.

In order to achieve the above objective, a technical solution of the present invention is implemented as follows.

In one embodiment, the present invention provides a method for implementing a dialing keypad of a touch screen, comprising:

Obtaining size information of the touch screen, and setting a circular display area of the touch screen with the center of the touch screen as an origin and a preset length as a radius, wherein the preset length is calculated according to the obtained size information of the touch screen;

Configuring attributes of each dialing control of the dialing keypad, wherein the attributes of the dialing control include numerical information, display information, and angle information of the dialing control;

Arranging all the dialing controls of the dialing keypad evenly distributed on the circumference of an edge of the circular display area, according to the obtained size information of the touch screen and the angle information of each dialing control of the dialing keypad; and Displaying all the dialing controls of the dialing keypad on the circumference of the edge of the circular display area of the touch screen, according to the numerical information and the display information of each dialing control of the dialing keypad.

Preferably, the method further comprises:

Configuring a trigger event of the dialing keypad, to respond to a sliding operation of a user on the touch screen, to record position information of a touch point at each moment during the last sliding operation of the user on the touch screen, and to convert the position information of the touch point at each moment into an included angle relative to a positive direction of the circumference, meanwhile to calculate a variation value of an included angle between a touch point at the current moment and the positive direction of the circumference relative to an included angle between a touch point at the previous moment and the positive direction of the circumference, and to obtain a changed included angle of the touch point at the current moment relative to the touch point at the previous moment; and Controlling all the dialing controls of the dialing keypad to rotate the changed included angle along with the sliding operation of the user, meanwhile according to current position information of each dialing control on the touch screen after the rotation of the changed included angle, and reconfiguring the angle information of each dialing control relative to the positive direction of the circumference.

Further preferably, when controlling all the dialing controls of the dialing keypad to rotate the changed included angle along with the sliding operation of the user, the method further comprises:

Detecting an included angle of any dialing control relative to the positive direction of the circumference, and displaying a number corresponding to the dialing control of the included angle relative to the positive direction of the circumference of which belongs to a preset included angle range, at the center position of the touch screen in a manner of pop-up; and Responding to an operation that the user stops sliding and leaves the touch screen, and inputting the number displayed at the center position of the touch screen in a manner of pop-up into a number entry box.

In another embodiment, the present invention provides a smart watch, comprising a touch screen and an apparatus for implementing a dialing keypad of the touch screen, wherein the apparatus comprises:

An obtaining unit, which is configured to obtain size information of the touch screen, and set a circular display area of the touch screen with the center of the touch screen as an origin and a preset length as a radius, wherein the preset length is calculated according to the obtained size information of the touch screen;

An attribute configuration unit, which is configured to configure attributes of each dialing control of the dialing keypad, wherein the attributes of the dialing control include numerical information, display information, and angle information of the dialing control;

An arrangement unit, which is configured to arrange all the dialing controls of the dialing keypad evenly distributed on the circumference of an edge of the circular display area, according to the size information of the touch screen obtained by the obtaining unit and the angle information of each dialing control of the dialing keypad configured by the attribute configuration unit; and A display unit, which is configured to display all the dialing controls of the dialing keypad on the circumference of the edge of the circular display area of the touch screen, according to the numerical information and the display information of each dialing control of the dialing keypad configured by the attribute configuration unit.

Preferably, the apparatus further comprises a trigger event configuration unit, which is configured to:

Configure a trigger event of the dialing keypad, to respond to a sliding operation of a user on the touch screen, to record position information of a touch point at each moment during the last sliding operation of the user on the touch screen, and to convert the position information of the touch point at each moment into an included angle relative to a positive direction of the circumference, meanwhile to calculate a variation value of an included angle between a touch point at the current moment and the positive direction of the circumference relative to an included angle between a touch point at the previous moment and the positive direction of the circumference, and to obtain a changed included angle of the touch point at the current moment relative to the touch point at the previous moment; and Control all the dialing controls of the dialing keypad to rotate the changed included angle along with the sliding operation of the user, meanwhile according to current position information of each dialing control on the touch screen after the rotation of the changed included angle, and reconfigure the angle information of each dialing control relative to the positive direction of the circumference;

Detect an included angle of any dialing control relative to the positive direction of the circumference, and display a number corresponding to the dialing control of the included angle relative to the positive direction of the circumference of which belongs to a preset included angle range, at the center position of the touch screen in a manner of pop-up; and Respond to an operation that the user stops sliding and leaves the touch screen, and input the number displayed at the center position of the touch screen in a manner of pop-up into a number entry box.

The embodiments of the present invention have the following advantageous effects. The technical solution provided by the embodiments of the present invention fully utilizes a space of the touch screen, reduces an operation of mistriggering other dialing controls by fingers in a dialing process, increases the success rate of the dialing operation, and enhances the user experience by configuring the attributes of the dialing controls of the dialing keypad and arranging all the dialing controls of the dialing keypad, so that the dialing controls are evenly distributed on the circumference of the edge of the circular display area of the touch screen, according to the obtained size information of the touch screen and the angle information of each dialing control while the dialing keypad of the touch screen is implemented. In a preferred solution, by configuring the trigger events of the dialing controls, the user may input a desired number into a number entry box on the touch screen by a sliding operation, so as to completely avoid the problem of mistriggers in the dialing process.

DETAILED DESCRIPTION OF VARIOUS EMBODIMENTS

Objectives, technical solutions and advantages of the present invention will become more apparent from the following detailed description of the present invention when taken in conjunction with the accompanying drawings.

Figure 1:
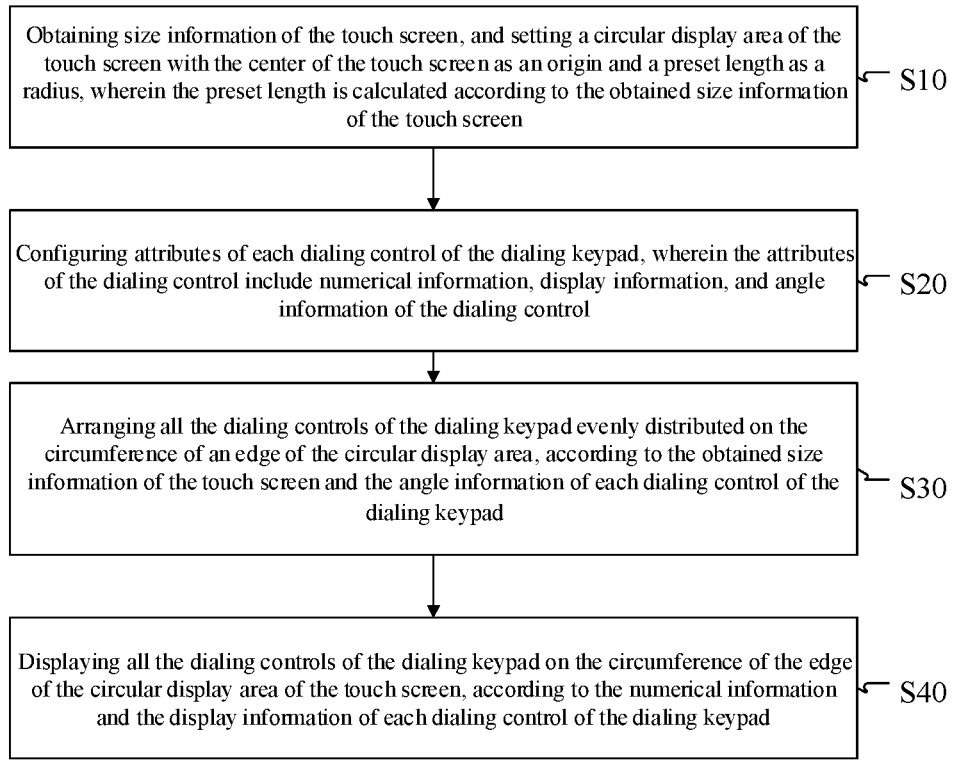
FIG. 1 is a flow diagram of a method for implementing a dialing keypad of a touch screen according to an embodiment of the present invention.

FIG. 1 is a flow diagram of a method for implementing a dialing keypad of a touch screen according to an embodiment of the present invention. The method for implementing a dialing keypad of a touch screen includes steps S10-S40.

S10 includes: obtaining size information of the touch screen, and setting a circular display area of the touch screen with the center of the touch screen as an origin and a preset length as a radius, wherein the preset length is calculated according to the obtained size information of the touch screen.

In the step S10, a circle corresponding to the circular display area of the touch screen is preferably the maximum inscribed circle of the touch screen, and the maximum inscribed circle of the touch screen should be understood as follows: when the dialing keypad is loaded and displayed on the touch screen, all the controls of the dialing keypad can be displayed on the touch screen completely. For example, the above circular display area is established with the center of the touch screen as a center of the circle and a width/2.5 of the touch screen as a radius, so that a user may obtain a better visual experience when number buttons are evenly distributed on the circumference of the circular display area, wherein long sides and wide sides of the touch screen are distinguished in terms of the length in this embodiment, so that shorter sides are set to the short sides of the touch screen, and longer sides are set to the long sides of the touch screen.

S20 includes: configuring attributes of each dialing control of the dialing keypad, wherein the attributes of the dialing control include numerical information, display information, and angle information of the dialing control.

In step S20, a preferred method of configuring angle information of each dialing control of the dialing keypad includes the following steps:

Equally dividing the above circumference into N portions according to the number of dialing controls of the dialing keypad, wherein N is equal to the number of the dialing controls of the dialing keypad; and if there are ten dialing controls with numbers of "0" to "9", equally dividing the circumference of an edge of the circular display area into ten portions; and Setting a positive direction of the circumference, obtaining an initial angle information value of the corresponding dialing control according to an included angle between each equally-dividing point on the circumference and the positive direction of the circumference, and configuring angle information in the attributes of each dialing control according to the initial angle information value.

The numerical information in the attributes of each dialing control refers to numbers of "0" to "9" displayed on the touch screen, and the display information includes a display mode, a color setting and the like of the dialing control on the touch screen. In this embodiment, in order to highlight a display effect of the dialing control on the touch screen, the numbers are displayed in a white color and a background is displayed in a relatively dark color; and a shape of the dialing control displayed on the touch screen is set to be identical to that of the touch screen, so as to provide a relatively comfortable visual perception. For example, when the touch screen is circular, each dialing control of the dialing keypad may be displayed as a circle. It is obvious that this embodiment is merely illustrative of functions of the numerical information and the display information in the attributes of the dialing control, and may be implemented with reference to design requirements when configuring the attributes of each dialing control. The angle information in the attributes of the dialing control is a changing value, and when the dialing keypad of the touch screen is initialized, the included angle between each dialing control and the positive direction of the circular display area is configured as an initial angle information value of the dialing control, and when the dialing control is distributed on the circular display area of the touch screen, initial position distribution of the dialing control on the touch screen can be achieved according to the initial angle information value of each dialing control.

S30 includes: arranging all the dialing controls of the dialing keypad evenly distributed on the circumference of an edge of the circular display area, according to the obtained size information of the touch screen and the angle information of each dialing control of the dialing keypad.

In step S30, a preferred method of arranging all the dialing controls of the dialing keypad, so as to distribute them evenly on the circular display area includes the following steps:

Calculating initial position information of each dialing control on the touch screen according to the initial angle information value of each dialing control of the dialing keypad, center position information of the touch screen as well as the preset length; and Evenly distributing the dialing controls on corresponding positions of the circumference of the edge of the circular display area according to the initial position information of each dialing control on the touch screen.

S40 includes: displaying all the dialing controls of the dialing keypad on the circumference of the edge of the circular display area of the touch screen, according to the numerical information and the display information of each dialing control of the dialing keypad.

In step S40, the circumference of the edge of the circular display area refers to a position on the circumference close to or positioned on the maximum inscribed circle of the touch screen.

This embodiment fully utilizes a space of the touch screen, and reduces an operation of mistriggering other dialing controls by fingers in a dialing process by configuring the angle information of the dialing control of the dialing keypad and evenly distributing all the dialing controls of the dialing keypad on the circumference of the edge of the circular display area of the touch screen according to the obtained size information of the touch screen and the angle information of each dialing control when the dialing keypad of the touch screen is implemented.

This embodiment is especially suitable for a touch screen with a small screen area.

After the dialing controls of the dialing keypad are evenly distributed on the circular display area of the touch screen, the user may select a corresponding number in a corresponding control area of the touch screen by clicking each dialing control. It is considered that when the corresponding control area of the dialing control on the touch screen is relatively small, there may still be an operation of mistriggering other dialing controls in the dialing process. Accordingly, in a process of implementing the dialing keypad of the touch screen, by the dialing keypad of the present invention, a desired number may be input into a number entry box by a sliding operation of the user on a non-control area of the touch screen.

In a preferred solution of this embodiment, all the dialing controls of the dialing keypad of the touch screen rotate along with the sliding operation of the user by the sliding operation of the user on the touch screen, and the number corresponding to the dialing control conforming to a preset condition is displayed at the center position of the touch screen as a prompt number in a manner of pop-up during rotating, and the user can stop this sliding operation according to the number displayed on the touch screen in a manner of pop-up, and input the number corresponding to the dialing control displayed in the middle of the touch screen in a manner of pop-up into a number entry box of the dialing keypad while fingers of the user leave the touch screen, so as to complete the input of the corresponding number.

Figure 2:
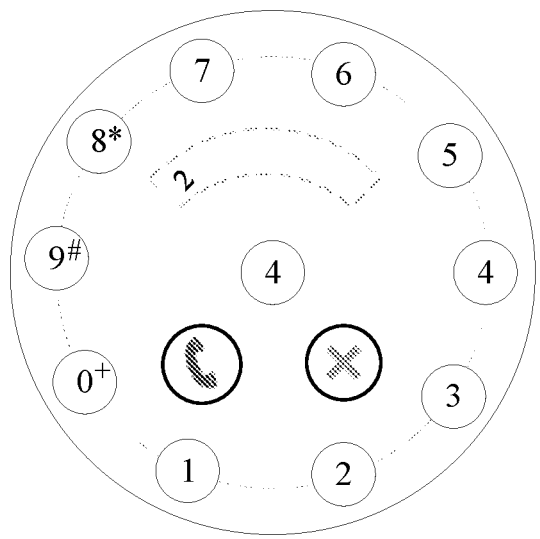
FIG. 2 is a schematic diagram of a dialing keypad of a touch screen according to an embodiment of the present invention.

In particular, in a preferred solution of this embodiment, after all the dialing controls of the dialing keypad are displayed on the circumference of the edge of the circular display area of the touch screen according to the numerical information and the display information of each dialing control of the dialing keypad, the method for implementing the dialing keypad of the touch screen further comprises:

Configuring a trigger event of the dialing keypad, to respond to a sliding operation of a user on the touch screen, to record position information of a touch point at each moment during the last sliding operation of the user on the touch screen, and to convert the position information of the touch point at each moment into an included angle relative to a positive direction of the circumference, meanwhile to calculate a variation value of an included angle between a touch point at the current moment and the positive direction of the circumference relative to an included angle between a touch point at the previous moment and the positive direction of the circumference, and to obtain a changed included angle of the touch point at the current moment relative to the touch point at the previous moment;

Controlling all the dialing controls of the dialing keypad to rotate the changed included angle along with the sliding operation of the user, meanwhile according to current position information of each dialing control on the touch screen after the rotation of the changed included angle, and reconfiguring the angle information of each dialing control relative to the positive direction of the circumference;

When controlling all the dialing controls of the dialing keypad to rotate the changed included angle along with the sliding operation of the user, the method further comprises: detecting an included angle of any dialing control relative to the positive direction of the circumference, and displaying a number corresponding to the dialing control of the included angle relative to the positive direction of the circumference of which belongs to a preset included angle range, at the center position of the touch screen in a manner of pop-up; and Responding to an operation that the user stops sliding and leaves the touch screen, and inputting the number displayed at the center position of the touch screen in a manner of pop-up into a number entry box, wherein the number entry box of the dialing keypad of the touch screen may be disposed at a corresponding position of the touch screen, such that when the dialing keypad of the touch screen is used to perform a dialing operation, the user can check the number which has been selected and input into the number entry box more conveniently and comfortably. With reference to FIG. 2, the number corresponding to the dialing control which belongs to the preset included angle range is displayed at the center position of the touch screen in a manner of pop-up, and the number entry box is disposed at the corresponding position relatively away from the center of the touch screen, so that the user is prevented from confusing the number which is displayed in a manner of pop-up with a number required to be input into the number entry box.

With reference to the step S30 of this embodiment and in conjunction with the above preferred solutions of this embodiment, the initial position information of each dialing control on the touch screen should be understood as follows: when the dialing keypad of the touch screen is initialized to evenly distribute all the dialing controls of the dialing keypad on the circumference of the edge of the circular display area, the initial position information of each dialing control on the touch screen may be obtained according to the initial angle information value of each dialing control of the dialing keypad, the center of the touch screen and the radius of the circular display area of the touch screen; and whenever the user performs a sliding dialing operation on the touch screen, all the dialing controls of the dialing keypad of the touch screen may be rotated according to the sliding operation of the user; and when the user completes a sliding dialing operation, none of the dialing controls return to initial positions of the touch screen during its initialization, but stay in the rotated current positions; that is to say, position information of each dialing control on the touch screen is a variable value. For ease of understanding, this embodiment distinguishes initial position information of the dialing control on the touch screen during the initialization from current position information regarding rotating along with the sliding operation of the user.

In this preferred solution, the dialing control of the dialing keypad is controlled to rotate along with the sliding operation of the user through the sliding operation of the user, an angle of each dialing control is detected in real time in a process of rotating the dialing control along with the sliding operation of the user, and the number corresponding to the dialing control conforming to a condition is input into the number entry box. The method of this preferred solution can thoroughly solve a problem of possible mistrigger operations in the dialing process of the dialing keypad.

In another preferred solution of this embodiment, each auxiliary key of the dialing keypad is configured together with one dialing control, respectively, thereby reducing the number of the controls distributed on the circumference of the edge of the circular display area of the touch screen, ensuring that there is a sufficient space between adjacent dialing controls, and further reducing the mistrigger operations in the dialing process. In particular, in another preferred solution of this embodiment, the method of implementing the dialing keypad of the touch screen further comprises: configuring each auxiliary key of the dialing keypad together with one dialing control, respectively. For example, as shown in FIG. 2, if the dialing keypad includes three auxiliary keys, namely, a pound key (# key), a star key (* key) and an add key (+ key), the pound key may be configured together with a dialing control with a number of "8", the star key may be configured together with a dialing control with a number of "9", and the add key may be configured together with a dialing control with a number of "0".

The method further comprises modifying the display information of the dialing control according to the auxiliary key, so that the dialing control configured with the auxiliary key displays its corresponding auxiliary key symbol. For example, display information of a "#" symbol is added in the display information of the control with the number of 8, and a "#" symbol is displayed on a display interface of the control corresponding to the number 8.

When configuring each auxiliary key of the dialing keypad together with one dialing control, respectively, and when displaying a number corresponding to the dialing control, the included angle relative to the positive direction of the circumference of which belongs to a preset included angle range, at the center position of the touch screen in a manner of pop-up, the method for implementing the dialing keypad of the touch screen further comprises:

Responding to a long-press operation of the user on the touch screen, timing the long-press operation; and when the counted time of the long-press operation is less than or equal to a preset time threshold, displaying the number corresponding to the dialing control at the center position of the touch screen in a manner of pop-up; and when the counted time of the long-press operation is greater than the preset time threshold, displaying the auxiliary key used together with the dialing control at the center position of the touch screen in a manner of pop-up.

It is to be noted that when the dialing control displayed at the center position of the touch screen in a manner of pop-up is configured alone, that is, when the dialing control is not configured together with the auxiliary key of the dialing keypad, even if the user performs the long-press operation on the touch screen, the dialing keypad of the touch screen may not perform the above response on the current long-press operation of the user.

By configuring each auxiliary key of the dialing keypad together with one dialing control, respectively, this preferred solution reduces the number of the controls required to be evenly distributed on the circumference of the edge of the circular display area of the touch screen, and ensures that the dialing control has a sufficient control area on the touch screen, such that when the user clicks the dialing control on the touch screen, the mistrigger operations may be further reduced, and the practicality and the ornamental value of the dialing keypad are improved.

In yet another preferred solution of this embodiment, the number of the controls distributed on the circumference of the edge of the circular display area of the touch screen is further reduced by distributing the function controls inside the circumference of the edge of the circular display area of the touch screen.

In particular, in yet further preferred solution of this embodiment, the method for implementing the dialing keypad of the touch screen further comprises: configuring attributes of a function control of the dialing keypad, wherein the attributes of the function control includes identifying information, display information and position information of the function control. In this embodiment, the function control includes a delete control and a phone control used to broadcast a phone number, answer and hang-up a phone call.

The method further comprises: distributing the function control of the dialing keypad inside the circumference of the edge of the touch screen according to the obtained size information of the touch screen and the position information of the function control; and Configuring a click event of the function control of the dialing keypad, to respond to a clicking operation of a user on the touch screen, and to operate the corresponding function control according to the position information clicked on the touch screen by the user.

In this preferred solution, the function control of the dialing keypad is distributed inside the circular display area, such that when the dialing keypad of the touch screen responds the sliding operation of the user on the touch screen, the function control of the dialing keypad is not rotated along with the sliding operation of the user, so that the user conveniently selects corresponding functions.

Since smart watches having phone functions in the market mostly use an Android system, this embodiment further illustrates the method for implementing the dialing keypad of the touch screen of the present invention and its advantageous effects by way of an example of a method for implementing a dialing keypad of a touch screen by using a smart watch based on an Android system.

In this embodiment, the dialing keypad of the touch screen of the smart watch comprises ten dialing controls, three auxiliary keys and two function controls, wherein the ten dialing controls are dialing controls corresponding to numbers of "0" to "9", the three auxiliary keys are the pound key (# Key), the star key (* key) and the add key (+ key) respectively, and the two function controls are the delete control and the phone control used to broadcast the phone number as well as answer and hang-up the phone call respectively.

The method for implementing the dialing keypad of the touch screen by using the smart watch in this embodiment includes the following steps:

Firstly, disposing the dialing controls, the auxiliary keys, and the function controls of the dialing keypad on corresponding positions on the touch screen;

Obtaining size information of the touch screen of the smart watch, and setting a circular display area of the touch screen with the center of the touch screen as an origin and a preset length as a radius, wherein the preset length is calculated according to the obtained size information of the touch screen; configuring numerical information, display information and angle information of the dialing control, and configuring a pound key together with a dialing control with a number of "9", configuring a star key together with a dialing control with a number of "8", and configuring an add key together with a dialing control with a number of "0". When the angle information of the dialing control is configured, a transverse rightward direction is set to a positive direction of the circular display area, the circumference of the edge of the circular display area is equally divided into ten portions, and an included angle between each equally-dividing point and the positive direction of the circumference corresponds to an angle information initial angle of one dialing control. It is assumed that an equally-dividing point forming an included angle of 0 degree with the positive direction of the circular area corresponds to a dialing control with a number of "4", an equally-dividing point forming an included angle of 36 degrees with the positive direction of the circular area corresponds to a dialing control with a number of "5", an equally-dividing point forming an included angle of 72 degrees with the positive direction of the circular area corresponds to a dialing control with a number of "6", and the like, the initial angle information value of each dialing control is obtained.

The method further comprises: after obtaining the initial angle information value of the dialing controls with the numbers of "0" to "9", calculating initial position information of the dialing control on the touch screen according to the initial angle information value of each dialing control as well as the center position of the touch screen and the above preset length, and evenly distributing the dialing controls on corresponding positions of the circumference of the circular display area according to the initial position information of the dialing controls.

It is considered that in an Android system, a position of each control on the touch screen is identified by a distance between the control and an upper edge of the touch screen and a distance between the control and a left edge of the touch screen. If the touch screen of the Android system serves as a rectangular plane coordinate system, the coordinate system uses an upper-left corner of the touch screen as an origin, a horizontal rightward direction as a positive direction of an X axis and a vertical downward direction as a positive direction of a Y axis in a default state, and the rectangular plane coordinate system of the touch screen of the Android system in this embodiment is denoted as an XOY coordinate system (i.e. a Cartesian coordinate system). In order to facilitate even distribution of all the dialing controls of the dialing keypad on the display area of the touch screen by the angle information of the dialing control of the dialing keypad and the size information of the touch screen, this embodiment further virtualizes an auxiliary coordinate system, which uses the center of the touch screen as an origin, a transverse rightward direction as a positive direction of an X axis and a vertical upward direction as a positive direction of a Y axis, and is denoted as an X'O'Y' coordinate system in this embodiment.

When distributing the dialing controls on corresponding positions of the touch screen is implemented in the Android system, the size information of the touch screen may be obtained through a corresponding interface of the Android system, and setting the circular display area CircleLayout of the touch screen is implemented by customizing a sub-class ViewGroup of a View view of the Android system.

Setting the CircleLayout specifically includes: using center position information of the touch screen in the size information, which is obtained through the corresponding interface of the Android system, of the touch screen as a center of circle, and using a width W/K of the touch screen in the size information of the touch screen as a radius, wherein K is a real number greater than 2, is equal to 2.5 in this embodiment, and certainly may further take other numerical values; calculating position information of the dialing control in the auxiliary coordinate system of the touch screen by the angle information initial angle of each dialing control, and obtaining position information of each dialing control in a default coordinate system of the touch screen by a mapping relationship between the default coordinate system and the auxiliary coordinate system of the touch screen; and distributing the dialing control on the corresponding position of the touch screen according to this position information.

By the mapping relationship between the default coordinate system and the auxiliary coordinate system of the touch screen, main codes of converting the position information of each dialing control in the auxiliary coordinate system into the corresponding position information of the dialing control in the default coordinate system are as follows.

A position of the dialing control is obtained by a layout onLayout method in the CircleLayout: x=radius*Math.cos (Math.toRadians(angle); //calculate horizontal coordinates of the dialing control in the XOY coordinate system
y=radius*Math.sin(Math.toRadians(angle); //calculate longitudinal coordinates of the dialing control in the XOY coordinate system
left=Math.round((float) (((layoutWidth/2)−childWidth/2)+ x))); //convert the horizontal coordinates in the XOY into horizontal coordinates in X'O'Y' top=Math.round((float) (((layoutHeight/2)−childHeight/2) +y))); //convert the longitudinal coordinates in the XOY into longitudinal coordinates in the X'O'Y'
child.layout(left, top, left+childWidth, top+childHeight); //set a position of the dialing control in the touch screen.

The radius in the above formula is a radius of the circular display area of the touch screen, Math.cos ( ) and Math.sin ( ) are respectively corresponding trigonometric functions used to solve a cosine value and a sine value in the Android system, angle is an included angle between the dialing control and the positive direction of the circular display area, Math.toRadians ( ) is a function used to convert an angle value into a radian value in the Android system, Math.round ( ) is a rounding function in the Android system, float ( ) is a forced conversion function in the Android system, layoutWidth and layoutHeight are respectively a width value and a height value of the touch screen, childWidth and childHeight are respectively a width value and a height value corresponding to each dialing control in the Android system, and child.layout ( ) is a position distribution function used to distribute the dialing control on the touch screen in the Android system.

After the dialing controls of the dialing keypad are distributed on the corresponding positions of the touch screen, the phone control and the delete control of the dialing keypad are distributed inside the circumference of the edge of the touch screen according to the size information of the touch screen as well as position information of the phone control and the delete control by configuring identifying information, display information and position information of the phone control and the delete control of the dialing keypad, so that distributing of all the controls of the dialing keypad is completed. With reference to FIG. 2, which is a schematic diagram of a dialing keypad of a touch screen implemented by the method of the present invention, the dialing controls with numbers of "0" and "9" are evenly distributed on the circumference of the edge of the circular display area; three auxiliary keys are sequentially configured together with numbers of "0", "8" and "9" to be displayed on the touch screen; the phone control and the delete control are distributed inside the circumference of the edge of the circular display area; and the number of "2" has been input into the number entry box of the touch screen by the sliding dialing operation of the user.

Then, a trigger event of the dialing keypad of the touch screen of the smart watch is configured.

In the Android system, the trigger event of configuring the dialing keypad of the touch screen mainly includes operations such as rotating, clicking and long-pressing the control, wherein responding the sliding operation of the user on the touch screen by the dialing keypad is mainly implemented by a onTouchEvent (the trigger event of the dialing keypad) method, the onTouchEvent includes a MotionEvent.ACTION_DOWN (press down) event, a MotionEvent.ACTION_MOVE (move) event and a MotionEvent.ACTION_UP (lift up) event.

This embodiment rewrites a onTouchEvent method in the Android system, records position information of a touch point at each moment in the auxiliary coordinate system during the last sliding operation of the user on the touch screen by the MotionEvent.ACTION_DOWN event, and converts the position information of the touch screen at each moment in the auxiliary coordinate system into angle information relative to the positive direction of the circumference; detects an angle information current value angle of each dialing control, and displays the number corresponding to the dialing control, an included angle relative to the positive direction of the circumference of which belongs to a preset included angle range, at the center position of the touch screen in a manner of pop-up, wherein the preset included angle range is a range of −18 degree to +18 degrees relative to the positive direction of the circumference; and prepares for timing the long-press event.

The MotionEvent.ACTION_MOVE event calculates a variation value of angle information of a touch point at the current moment and the positive direction of the circumference relative to angle information of a touch point at the previous moment and the positive direction of the circumference, obtains a changed included angle angle_move of the touch point at the current moment relative to the touch point at the previous moment, controls all the dialing controls of the dialing keypad to rotate the changed included angle angle_move along with the sliding operation of the user, meanwhile according to current position information of each dialing control on the touch screen after the changed included angle angle_move is rotated, and reconfigures the angle information current value angle of each dialing control relative to the positive direction of the circumference.

To respond to an operation that the user stops sliding and leaves the touch screen, the MotionEvent.ACTION_UP event inputs the number displayed at the center position of the touch screen in a manner of pop-up into the number entry box and cancels timing of the long-press event.

After the trigger events of the dialing controls of the dialing keypad are completely configured, configuring of the trigger events of the phone control and the delete control of the dialing keypad is implemented by configuring a click event of a button in the Android system.

In a preferred solution of this embodiment, the click event of the dialing control of the dialing keypad may be further configured, and to respond to a clicking operation of the user on the touch screen, a traditional clicking dialing method is provided to the user.

Figure 3:
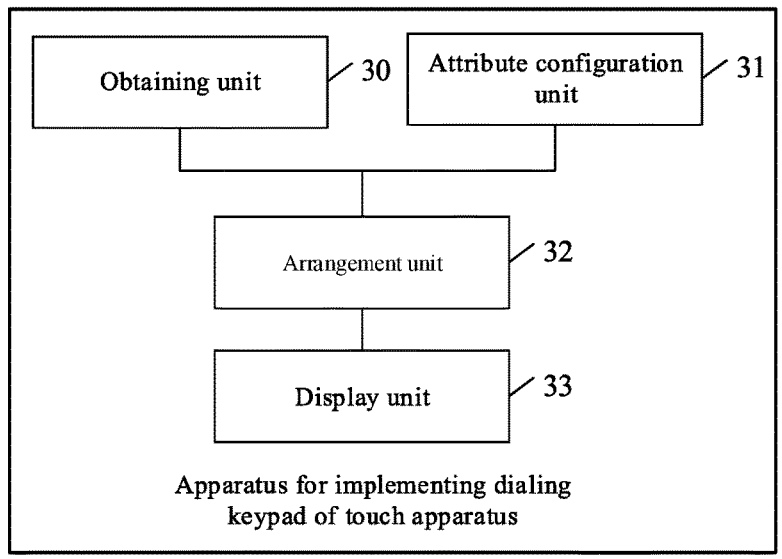
FIG. 3 is a schematic diagram of a structure of an apparatus for implementing a dialing keypad of a touch screen according to an embodiment of the present invention.

Based on a technical concept which is identical to that of the above method for implementing the dialing keypad of the touch screen, embodiments of the present invention further provide a smart watch, including a touch screen and an apparatus for implementing a dialing keypad of the touch screen. FIG. 3 is a schematic diagram of a structure of an apparatus for implementing a dialing keypad of a touch screen according to an embodiment of the present invention. The apparatus includes:

An obtaining unit 30, which is configured to obtain size information of the touch screen, and set a circular display area of the touch screen with the center of the touch screen as an origin and a preset length as a radius, wherein the preset length is calculated according to the obtained size information of the touch screen;

An attribute configuration unit 31, which is configured to configure attributes of each dialing control of the dialing keypad, wherein the attributes of the dialing control include numerical information, display information, and angle information of the dialing control;

An arrangement unit 32, which is configured to arrange all the dialing controls of the dialing keypad evenly distributed on the circumference of an edge of the circular display area, according to the size information of the touch screen obtained by the obtaining unit 30 and the angle information of each dialing control of the dialing keypad configured by the attribute configuration unit 31; and A display unit 33, which is configured to display all the dialing controls of the dialing keypad on the circumference of the edge of the circular display area of the touch screen, according to the numerical information and the display information of each dialing control of the dialing keypad configured by the attribute configuration unit 31.

In a preferred solution of this embodiment, the attribute configuration unit 31 is specifically configured to equally divide the circumference of the edge of the circular display area into N portions according to the number of dialing controls of the dialing keypad, wherein N is equal to the number of the dialing controls of the dialing keypad; set a positive direction of the circumference, obtain an initial angle information value of the corresponding dialing control according to an included angle between each equally-dividing point on the circumference and the positive direction of the circumference, and configure angle information in the attributes of each dialing control according to the initial angle information value.

The arrangement unit 32 is specifically configured to calculate initial position information of each dialing control on the touch screen according to the initial angle information value of each dialing control of the dialing keypad, center position information of the touch screen as well as the preset length; and evenly distribute the dialing controls on corresponding positions of the circumference of the edge of the circular display area according to the initial position information of each dialing control on the touch screen.

In another preferred solution of this embodiment, by configuring each auxiliary key of the dialing keypad together with one dialing control, respectively, the attribute configuration unit 31 reduces the number of the controls distributed on the circumference of the edge of the circular display area of the touch screen, which ensures that there is a sufficient space between adjacent dialing controls, and further reduces the mistrigger operations in the dialing process.

In particular, the attribute configuration unit 31 is further configured to configure each auxiliary key of the dialing keypad together with one dialing control, respectively; and modify the display information of the dialing control according to the auxiliary key. In this preferred solution, the auxiliary keys of the dialing keypad exemplarily include a pound key (# key), a star key (* key) and an add key (+ key). The attribute configuration unit 31 may configure the pound key together with a dialing control with a number of "8", the star key together with a dialing control with a number of "9", and the add key together with a dialing control with a number of "0".

In yet another preferred solution of this embodiment, the attribute configuration unit 31 further reduces the number of the controls distributed on the circumference of the edge of the circular display area of the touch screen by distributing the function controls inside the circumference of the edge of the circular display area of the touch screen.

In particular, the attribute configuration unit 31 is further configured to configure attributes of a function control of the dialing keypad, wherein the attributes of the function control includes identifying information, display information and position information of the function control; distribute the function control of the dialing keypad inside the circumference of the edge of the touch screen according to the obtained size information of the touch screen and the position information of the function control; and configure a click event of the function control of the dialing keypad, to respond to a clicking operation of the user on the touch screen, and to operate the corresponding function control according to the position information clicked on the touch screen by the user.

When traditional clicking dialing is performed by using the dialing keypad obtained by the apparatus for implementing the dialing keypad of the touch screen provided by the above technical solution and the corresponding control area of the dialing control on the touch screen is relatively small, there may still be an operation of mistriggering other dialing controls in a dialing process. Accordingly, in a process of implementing the dialing keypad of the touch screen, by the dialing keypad, a desired number may be input into a number entry box by a sliding operation of the user on a non-control area of the touch screen.

In particular, the apparatus for implementing the dialing keypad of the touch screen of this embodiment further includes a trigger event configuration unit, which is configured to:

Configure a trigger event of the dialing keypad, to respond to a sliding operation of a user on the touch screen, to record position information of a touch point at each moment during the last sliding operation of the user on the touch screen, and to convert the position information of the touch point at each moment into an included angle relative to a positive direction of the circumference, meanwhile to calculate a variation value of an included angle between a touch point at the current moment and the positive direction of the circumference relative to an included angle between a touch point at the previous moment and the positive direction of the circumference, and to obtain a changed included angle of the touch point at the current moment relative to the touch point at the previous moment; and Control all the dialing controls of the dialing keypad to rotate the changed included angle along with the sliding operation of the user, meanwhile according to current position information of each dialing control on the touch screen after the rotation of the changed included angle, and reconfigure the angle information of each dialing control relative to the positive direction of the circumference;

Detect an included angle of any dialing control relative to the positive direction of the circumference, and display a number corresponding to the dialing control of the included angle relative to the positive direction of the circumference of which belongs to a preset included angle range, at the center position of the touch screen in a manner of pop-up; and Respond to an operation that the user stops sliding and leaves the touch screen, and input the number displayed at the center position of the touch screen in a manner of pop-up into a number entry box.

When the attribute configuration unit 31 is configured to configure each auxiliary key of the dialing keypad together with one dialing control, respectively, so as to reduce the number of the controls distributed on the circumference of the edge of the circular display area of the touch screen and ensure that there is a sufficient space between adjacent dialing controls, the trigger event configuration unit in this embodiment is further configured to: respond to a long-press operation of the user on the touch screen, time the long-press operation; and when the counted time of the long-press operation is less than or equal to a preset time threshold, display a number corresponding to the dialing control at the center position of the touch screen in a manner of pop-up; and when the counted time of the long-press operation is greater than the preset time threshold, display an auxiliary key used together with the dialing control at the center position of the touch screen in a manner of pop-up.

Specific chained connection relationships and specific functions of individual function modules of the apparatus for implementing the dialing keypad of the touch screen of the smart watch of the present invention may refer to the detailed description of the method for implementing the dialing keypad of the touch screen of the present invention, which will be omitted herein.

In conclusion, the embodiments of the present invention provide a method for implementing a dialing keypad of a touch screen and a smart watch, which fully utilizes a space of the touch screen, reduces an operation of mistriggering other dialing controls by fingers in a dialing process, increases the success rate of the dialing operation, and enhances the user experience by configuring the attributes of the dialing controls of the dialing keypad and evenly distributing all the dialing controls of the dialing keypad on the circumference of the edge of the circular display area of the touch screen according to the obtained size information of the touch screen and the angle information of each dialing control when the dialing keypad of the touch screen is implemented. In a preferred solution, by configuring the trigger events of the dialing controls, the user may input a desired number into a number entry box on the touch screen by a sliding operation, so as to completely avoid the problem of mistriggers in the dialing process. The followings should be noted.

Various component embodiments of the present invention may be implemented by hardware, or by software modules running on one or more processors, or by a combination thereof. It will be appreciated by those skilled in the art that some or all of functions of some or all of components in accordance with the embodiments of the present invention may be implemented by using a microprocessor or a digital signal processor (DSP) in practice. The present invention may also be implemented as a part or all of devices or apparatus programs (e.g., computer programs and computer program products) for performing the methods described herein. Such a program for implementing the present invention may be stored on a computer-readable medium or may have a form of one or more signals. Such signals may be downloaded from an Internet website, either provided over a carrier signal or provided in any other form.

Figure 4:
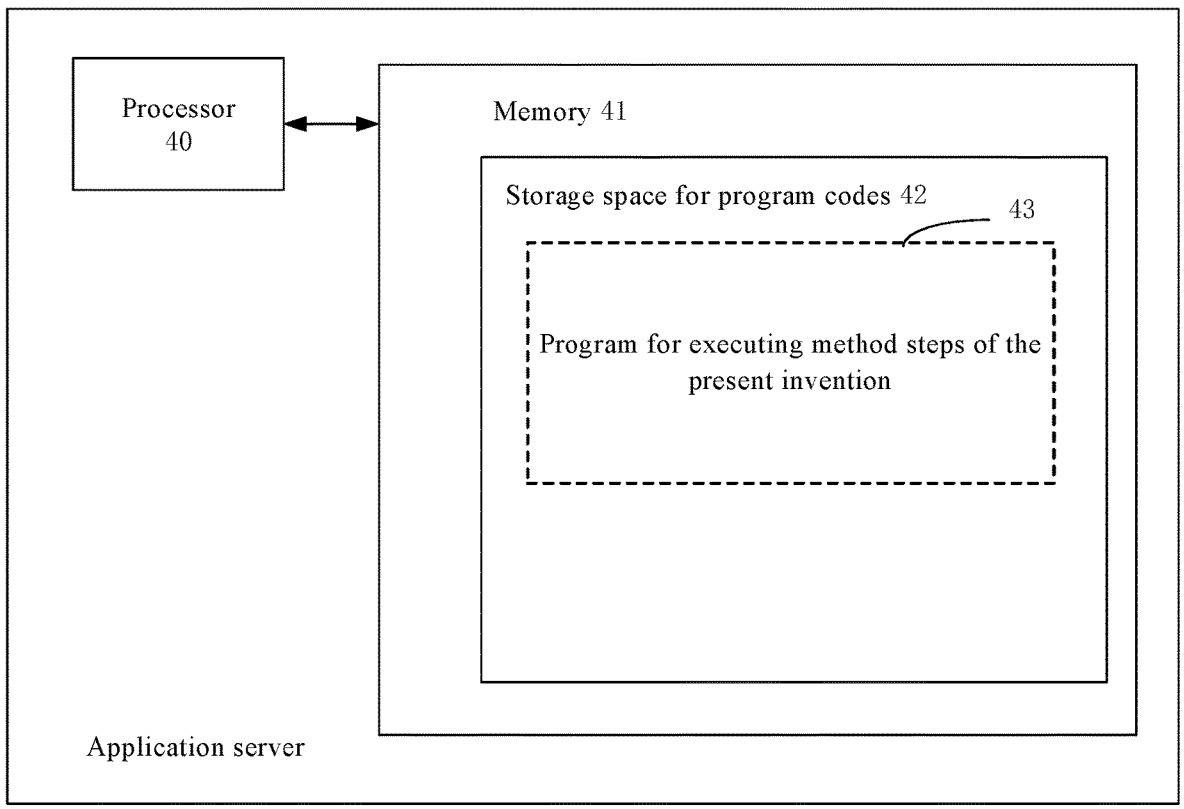
FIG. 4 schematically shows a block diagram of a server for performing the method according to the present invention.

For example, FIG. 4 shows a server for implementing a dialing keypad of a touch screen, for example, an application server, according to a method of the present invention. The server traditionally includes a processor 40 and a computer program product or a computer-readable medium in a form of a memory 41. The memory 41 may be an electronic memory such as a flash memory, an EEPROM (Electrically Erasable Programmable Read Only Memory), an EPROM, a hard disk, or a ROM. The memory 41 has a storage space 42 for program codes 43 for executing any of method steps in the above method. For example, the storage space 42 for the program codes may include respective program codes 43 for implementing various steps in the above method, respectively. These program codes may be read from one or more computer program products or written into one or more computer program products. These computer program products include program code carriers such as hard disks, compact disks (CDs), memory cards, or floppy disks.

It should be noted that the above-described embodiments are illustrative of the present invention and are not intended to limit the present invention, and that those skilled in the art will design alternative embodiments without departing from the scope of the appended claims. In the claims, the word "comprise" does not exclude the presence of elements or steps not listed in the claims. The present invention may be implemented by hardware including several different elements and by a suitably programmed computer. In the unit claims enumerating several means, several of these means may be embodied by the same item of hardware.

What is claimed is:

1. A method for implementing a dialing keypad of a touch screen, the method comprising the steps of:
   obtaining size information of the touch screen, and setting a circular display area of the touch screen with the center of the touch screen as an origin and a preset length as a radius such that a circle corresponding to the circular display area of the touch screen is a maximum inscribed circle of the touch screen, wherein the preset length is calculated according to the obtained size information of the touch screen;
   configuring attributes of each dialing control of the dialing keypad, wherein attributes of a dialing control include numerical information, display information, and angle information of the dialing control, wherein the numerical information in the attributes of the dialing control refers to numbers "0" to "9" displayed on the touch screen by the dialing control, and wherein auxiliary keys of the dialing keypad are respectively configured to be together with one dialing control;
   arranging all the dialing controls of the dialing keypad evenly distributed on the circumference of an edge of the circular display area, according to the obtained size information of the touch screen and the angle information of each dialing control of the dialing keypad;
   displaying all the dialing controls of the dialing keypad on the circumference of the edge of the circular display area of the touch screen, according to the numerical information and the display information of each dialing control of the dialing keypad, wherein the circumference of the edge of the circular display area refers to a position on the circumference adjacent to or positioned on the maximum inscribed circle of the touch screen;
   configuring a trigger event of the dialing keypad, to respond to a sliding operation of a user on the touch screen, to record position information of a touch point at each time point during the last sliding operation of the user on the touch screen, and to convert the position information of the touch point at each time point into an included angle relative to a positive direction of the circumference, meanwhile to calculate a variation value of an included angle between a touch point at the current time point and the positive direction of the circumference relative to an included angle between a touch point at the previous time point and the positive direction of the circumference, and to obtain a changed included angle of the touch point at the current time point relative to the touch point at the previous time point; and
   controlling all the dialing controls of the dialing keypad to rotate the changed included angle along with the sliding operation of the user, when detecting an included angle of any dialing control relative to the positive direction of the circumference, and displaying a number corresponding to the dialing control of the included angle relative to the positive direction of the circumference of which belongs to a preset included angle range, at the center position of the touch screen in a manner of pop-up; and responding to an operation that the user stops sliding and leaves the touch screen, and inputting the number displayed at the center position of the touch screen in a manner of pop-up into a number entry box; meanwhile according to current position information of each dialing control on the touch screen after the rotation of the changed included angle, and reconfiguring the angle information of each dialing control relative to the positive direction of the circumference.

2. The method according to claim 1, wherein the step of configuring attributes of each dialing control of the dialing keypad comprises:
equally dividing the circumference of the edge of the circular display area into N portions according to the number of dialing controls of the dialing keypad, wherein N is equal to the number of the dialing controls of the dialing keypad; and
setting a positive direction of the circumference, obtaining an initial angle information value of the corresponding dialing control according to an included angle between each equally-dividing point on the circumference and the positive direction of the circumference, and configuring angle information in the attributes of each dialing control according to the initial angle information value.

3. The method according to claim 2, wherein the step of arranging all the dialing controls of the dialing keypad, according to the obtained size information of the touch screen and the angle information of each dialing control of the dialing keypad, so that the dialing controls are evenly distributed on the circumference of an edge of the circular display area comprises:
calculating initial position information of each dialing control on the touch screen according to the initial angle information value of each dialing control of the dialing keypad, center position information of the touch screen as well as the preset length; and
evenly distributing the dialing controls on corresponding positions of the circumference of the edge of the circular display area according to the initial position information of each dialing control on the touch screen.

4. The method according to claim 1, wherein the step of configuring attributes of each dialing control of the dialing keypad further comprises modifying the display information of the dialing control according to the auxiliary keys.

5. The method according to claim 4, wherein, when displaying a number corresponding to the dialing control, the included angle relative to the positive direction of the circumference of which belongs to a preset included angle range, at the center position of the touch screen in a manner of pop-up, the method further comprises:
responding to a long-press operation of the user on the touch screen, timing the long-press operation, and when the counted time of the long-press operation is less than or equal to a preset time threshold, displaying the number corresponding to the dialing control at the center position of the touch screen in a manner of pop-up; and when the counted time of the long-press operation is greater than the preset time threshold, displaying the auxiliary key used together with the dialing control at the center position of the touch screen in a manner of pop-up.

6. The method according to claim 1, further comprising the steps of:
configuring attributes of a function control of the dialing keypad, wherein the attributes of the function control includes identifying information, display information and position information of the function control;
distributing the function control of the dialing keypad inside the circumference of the edge of the touch screen according to the obtained size information of the touch screen and the position information of the function control; and configuring a click event of the function control of the dialing keypad, to respond to a clicking operation of a user on the touch screen, and to operate the corresponding function control according to the position information clicked on the touch screen by the user.

7. A smart watch, comprising a touch screen and an apparatus for implementing a dialing keypad of the touch screen, wherein the apparatus comprises:
an obtaining unit, which is configured to obtain size information of the touch screen, and set a circular display area of the touch screen with the center of the touch screen as an origin and a preset length as a radius such that a circle corresponding to the circular display area of the touch screen is a maximum inscribed circle of the touch screen, wherein the preset length is calculated according to the obtained size information of the touch screen;
an attribute configuration unit, which is configured to configure attributes of each dialing control of the dialing keypad, wherein attributes of a dialing control include numerical information, display information, and angle information of the dialing control, wherein the numerical information in the attributes of the dialing control refers to numbers "0" to "9" displayed on the touch screen by the dialing control, and wherein auxiliary keys of the dialing keypad are respectively configured to be together with one dialing control;
an arrangement unit, which is configured to arrange all the dialing controls of the dialing keypad evenly distributed on the circumference of an edge of the circular display area, according to the size information of the touch screen obtained by the obtaining unit and the angle information of each dialing control of the dialing keypad configured by the attribute configuration unit;
a display unit, which is configured to display all the dialing controls of the dialing keypad on the circumference of the edge of the circular display area of the touch screen, according to the numerical information and the display information of each dialing control of the dialing keypad configured by the attribute configuration unit, wherein the circumference of the edge of the circular display area refers to a position on the circumference adjacent to or positioned on the maximum inscribed circle of the touch screen; and
a trigger event configuration unit, which is configured to:
configure a trigger event of the dialing keypad, to respond to a sliding operation of a user on the touch screen, to record position information of a touch point at each time point during the last sliding operation of the user on the touch screen, and to convert the position information of the touch point at each time point into an included angle relative to a positive direction of the circumference, meanwhile to calculate a variation value of an included angle between a touch point at the current time point and the positive direction of the circumference relative to an included angle between a touch point at the previous time point and the positive direction of the circumference, and to obtain a changed included angle of the touch point at the current time point relative to the touch point at the previous time point; and
control all the dialing controls of the dialing keypad to rotate the changed included angle along with the sliding operation of the user, detect an included angle of any dialing control relative to the positive direction of the circumference, and display a number corresponding to the dialing control of the included angle relative to the positive direction of the circumference of which belongs to a preset included angle range, at the center position of the touch screen in a manner of pop-up; respond to an operation that the user stops sliding and leaves the touch screen, and input the number displayed at the center position of the touch screen in a manner of pop-up into a number entry box; meanwhile according to current position information of each dialing control on the touch screen after the rotation of the changed included angle, and reconfigure the angle information of each dialing control relative to the positive direction of the circumference.

8. The smart watch according to claim 7, wherein:
the attribute configuration unit is specifically configured to:
equally divide the circumference of the edge of the circular display area into N portions according to the number of dialing controls of the dialing keypad, wherein N is equal to the number of the dialing controls of the dialing keypad; and
set a positive direction of the circumference, obtain an initial angle information value of the corresponding dialing control according to an included angle between each equally-dividing point on the circumference and the positive direction of the circumference, and configure angle information in the attributes of each dialing control according to the initial angle information value; and
the arrangement unit is specifically configured to:
calculate initial position information of each dialing control on the touch screen according to the initial angle information value of each dialing control of the dialing keypad, center position information of the touch screen as well as the preset length; and
evenly distribute the dialing controls on corresponding positions of the circumference of the edge of the circular display area according to the initial position information of each dialing control on the touch screen.

9. The smart watch according to claim 7, wherein the attribute configuration unit is further configured to modify the display information of the dialing control according to the auxiliary key.

10. The smart watch according to claim 9, wherein, when displaying a number corresponding to the dialing control, the included angle relative to the positive direction of the circumference of which belongs to a preset included angle range, at the center position of the touch screen in a manner of pop-up, the trigger event configuration unit is further configured to:
respond to a long-press operation of a user on the touch screen, time the long-press operation, and when the counted time of the long-press operation is less than or equal to a preset time threshold, display the number corresponding to the dialing control at the center position of the touch screen in a manner of pop-up; and when the counted time of the long-press operation is greater than the preset time threshold, display an auxiliary key used together with the dialing control at the center position of the touch screen in a manner of pop-up.

11. The smart watch according to claim 7, wherein the attribute configuration unit is further configured to:
configure attributes of a function control of the dialing keypad, wherein the attributes of the function control includes identifying information, display information and position information of the function control;
distribute the function control of the dialing keypad inside the circumference of the edge of the touch screen according to the obtained size information of the touch screen and the position information of the function control; and
configure a click event of the function control of the dialing keypad, to respond to a clicking operation of a user on the touch screen, and to operate the corresponding function control according to the position information clicked on the touch screen by the user.

12. A computer program, comprising at least one non-transitory computer-readable storage medium having computer-readable codes embodied therein, causing, when the computer-readable codes run on a server, the server to execute the method for implementing a dialing keypad of a touch screen according to claim 1.

13. The computer program according to claim 12, wherein, when the computer-readable codes run on the server, the configuring attributes of each dialing control of the dialing keypad further comprises modifying the display information of the dialing control according to the auxiliary key.

14. The computer program according to claim 12, wherein, when the computer-readable codes run on the server and when displaying a number corresponding to the dialing control, the included angle relative to the positive direction of the circumference of which belongs to a preset included angle range, at the center position of the touch screen in a manner of pop-up, the server further executes the step of:
responding to a long-press operation of the user on the touch screen, timing the long-press operation, and when the counted time of the long-press operation is less than or equal to a preset time threshold, displaying the number corresponding to the dialing control at the center position of the touch screen in a manner of pop-up; and when the counted time of the long-press operation is greater than the preset time threshold, displaying the auxiliary key used together with the dialing control at the center position of the touch screen in a manner of pop-up.

* * * * *